Dec. 27, 1949        F. JOHNSON        2,492,291
DENTAL FLOSS HOLDER
Filed April 4, 1949
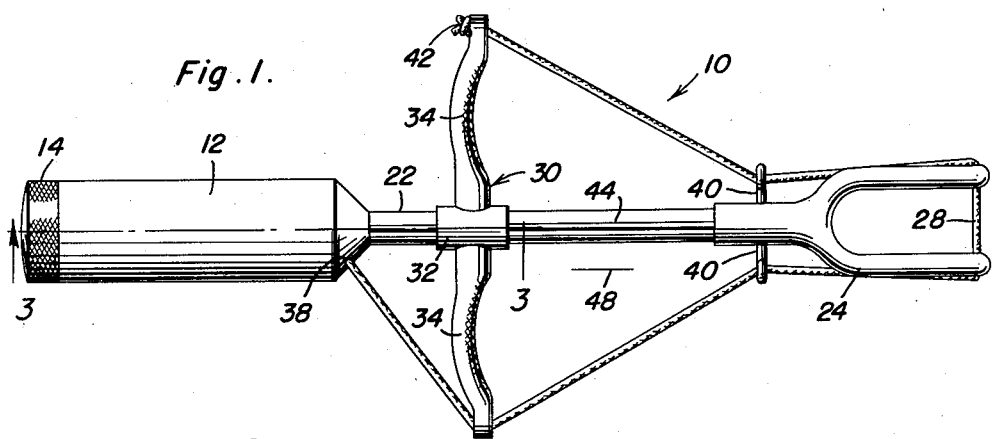
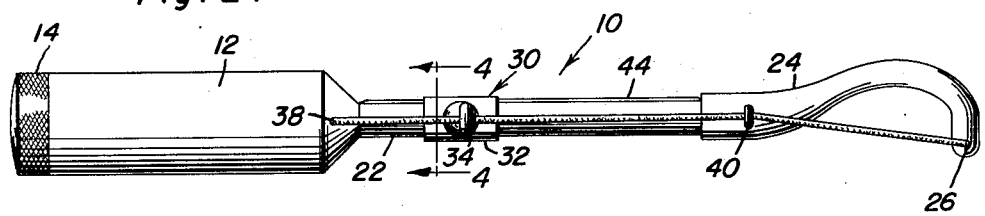
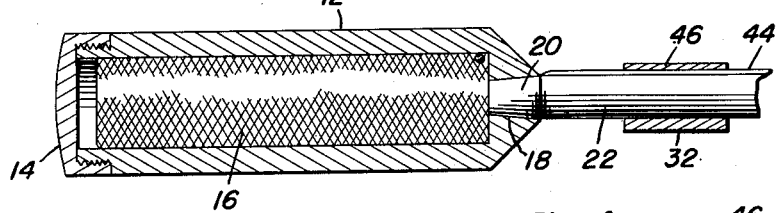
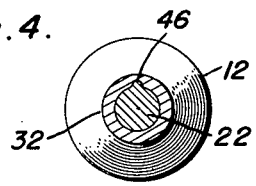
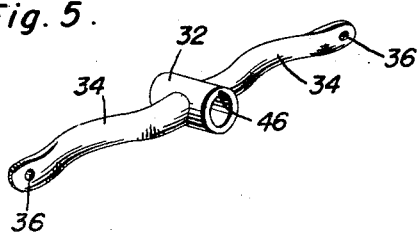
Inventor
Frank Johnson

Patented Dec. 27, 1949

2,492,291

UNITED STATES PATENT OFFICE 2,492,291

DENTAL FLOSS HOLDER

Frank Johnson, Bakersfield, Calif.

Application April 4, 1949, Serial No. 85,349

4 Claims. (Cl. 132—92)

This invention relates to new and useful improvements and structural refinements in devices for holding and manipulating dental floss, and the principal object of the invention is to facilitate retention of the floss in a tightly stretched condition while it is being manipulated between and around the teeth.

An important feature of the invention, therefore, resides in the provision of means for stretching the dental floss which means also perform an additional function, namely that of drawing the floss from the spool on which it is usually supplied.

Some of the advantages of the invention reside in its simplicity of construction, in its pleasing appearance, in its convenient and expeditious operation, and in its adaptability to economical manufacture.

With the above more important objects and features in view and such other objects and features as may become apparent as this specification proceeds, the invention consists essentially of the construction and arrangement of parts as shown in the accompanying drawings in which:

Figure 1 is a top plan view of the invention.

Figure 2 is a side elevational view thereof.

Figure 3 is a fragmentary cross-sectional view, taken substantially in the plane of the line 3—3 in Figure 1.

Figure 4 is a cross-sectional detail, taken substantially in the plane of the line 4—4 in Figure 2, and Figure 5 is a perspective view of an actuating member used in the invention.

Like characters of reference are employed to designate like parts in the specification and throughout the several views.

Referring now to the accompanying drawings in detail, the invention consists of a dental floss holder designated generally by the reference character 10, the same embodying in its construction a substantially cylindrical housing 12, provided at one end thereof with a removable cover or cap 14 whereby a conventional spool of dental floss 16 may be inserted in the housing, as illustrated in Figure 3.

The remaining end of the housing 12 is formed with an inwardly tapered socket 18 to accommodate a correspondingly tapered end portion 20 of an arm or rod 22, which extends outwardly from the housing but is rigidly secured thereto by virtue of the socket 18 and portion 20.

A fork 24, configurated substantially as shown, is rigidly secured to the outer end portion of the arm 22, the side pieces or arms of this fork being downwardly arcuated as is best shown in Figure 2 and being provided adjacent the free ends thereof with transversely alined apertures 26, through which dental floss may be threaded so that a stretch 28 of the floss between the side pieces of the fork may be manipulated between and around the teeth while the housing 12 functions as a handle for the entire device.

An actuating member designated generally by the reference character 30, consists of a tubular sleeve 32 which is slidable on the arm 22 toward and away from the fork 24, the sleeve 32 being formed integrally with a pair of laterally outstretched limbs or finger pieces 34, provided adjacent their outer ends with suitable apertures 36.

The end portion of the housing 12 to which the arm 22 is secured is formed with an aperture 38 through which the dental floss on the spool may be extended outwardly and passed through the aperture of one of the finger pieces 34, before being directed to the fork 24.

It is to be noted that the lateral "stretch" of the finger pieces 34 is substantially greater than the width of the fork 24, and accordingly means are provided for guiding the dental floss to and from the fork so that the floss is disposed immediately adjacent the side pieces of the fork and does not interfere with the manipulation of the device in poorly accessible locations of the oral cavity. These means involve the provision of a pair of laterally projecting guides 40 on that portion of the fork 24 which is secured to the arm 22, the guides 40 being provided in their outer end portions with suitable apertures or eyes through which the dental floss may be threaded before and after it passes through the apertures 26 of the fork. In this manner, stretches of the floss between the guides 40 and the transverse stretch 28 are substantially parallel, but the stretches between the guide 40 and the finger pieces 34 are mutually divergent as shown in Figure 1. It is to be noted that the free end of the floss is anchored to the remaining finger piece 34 by being passed through the aperture of the latter and knotted as at 42.

Means are also provided for preventing rotation of the actuating member 30 on the arm 22, these means involving the provision of a longitudinal rib 44 on the arm, together with the provision of a longitudinal key way 46, in the sleeve 32, the rib 44 being slidably received in the key way 46, so that the finger pieces 34 are retained substantially in the plane of the side pieces of the fork 24, as shown in Figure 1.

It should be explained at this point that the invention is particularly invented for use in association with those conventional spools of dental floss which are provided with frictional means for preventing the floss from unwinding freely from the spools, and accordingly, when the invention is placed in use and the floss is threaded through the various apertures or openings as has already been explained, the housing 12 may be grasped in the palm of the hand while two fingers are applied to the finger pieces 34. Thereupon by simply exerting finger pressure on the finger pieces in the direction of the arrow 48, the portion 28 of the floss between the side pieces of the fork 24 will be maintained in a tightly stretched condition while the device is being manipulated.

It is to be noted that the pressure exerted by the fingers on the finger pieces 34 in the direction of the arrow 48 should be only sufficient to maintain the portion 28 of the floss in a tightly stretched condition, but should not be sufficient to cause the floss to be withdrawn or unwound from the spool in the housing 12.

However, when the portion 28 of the floss is no longer usable, a new stretch of floss may be readily drawn in position, this being achieved by simply exerting greater force on the finger pieces 34 in the direction of the arrow 48, so as to withdraw an additional length of floss from the housing 12. When this has been accomplished, the actuating member 30 may be slid toward the fork 24 and a new knot may be tied on the free end of the floss, whereupon the device is in readiness for repeated operation.

It is believed that the advantages and use of the invention will be clearly apparent from the foregoing disclosure and accordingly, further description thereof at this time is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a dental floss holder, the combination of a housing for a spool of dental floss, an outwardly extending arm provided on said housing and terminating at its outer end in a fork, an actuating member slidable on said arm toward and away from said fork and including a pair of laterally projecting finger pieces, one of the finger pieces being formed with a passage through which floss may be extended from said housing and over said fork to the remaining finger piece, and means for anchoring the floss to said last mentioned finger piece whereby the floss extending over said fork may be stretched by sliding said actuating member away from the fork on said arm.

2. The device as defined in claim 1 together with means provided on said arm adjacent said fork for guiding stretches of floss between the fork and said actuating member.

3. The device as defined in claim 1 together with means for preventing rotation of said member on said arm.

4. In a dental floss holder, the combination of a housing for a spool of dental floss, an outwardly extending arm provided on said housing and terminating at its outer end in a fork, an actuating member non-rotatable but slidable on said arm toward and away from said fork, said member including a pair of laterally outstretched finger pieces each provided in its outer end portion with an aperture whereby floss may be extended from said housing through one of the finger pieces and over said fork for anchoring to the remaining finger piece, and a pair of laterally projecting floss guides provided on said fork.

FRANK JOHNSON.

No references cited.